(12) United States Patent
Ebara

(10) Patent No.: US 6,547,426 B1
(45) Date of Patent: Apr. 15, 2003

(54) WATER IMPERMEABLE LIGHTING DEVICE FOR A VEHICLE

(75) Inventor: Katsumi Ebara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/510,192

(22) Filed: Feb. 22, 2000

(30) Foreign Application Priority Data

Feb. 22, 1999 (JP) ............................................. 11-042510

(51) Int. Cl.[7] ................................................. F21V 33/00
(52) U.S. Cl. ...................... 362/473; 362/474; 362/547; 362/294; 362/373
(58) Field of Search ................................. 362/473, 474, 362/475, 476, 547, 294, 373, 96

(56) References Cited

U.S. PATENT DOCUMENTS

| | | | | |
|---|---|---|---|---|
| 4,636,922 A | * | 1/1987 | Takimoto et al. ........... | 362/476 |
| 4,802,068 A | * | 1/1989 | Mokry ........................ | 362/547 |
| 5,251,111 A | * | 10/1993 | Nagengast et al. .......... | 362/547 |
| 5,641,224 A | * | 6/1997 | Makita et al. ............... | 362/294 |
| 5,642,935 A | * | 7/1997 | Schmitt ....................... | 362/294 |
| 5,980,074 A | * | 11/1999 | Hwang ....................... | 362/547 |
| 6,042,255 A | * | 3/2000 | Kibayashi ................... | 362/547 |
| 6,164,806 A | * | 12/2000 | Schmickl et al. ........... | 362/547 |
| 6,210,014 B1 | * | 4/2001 | Kubizne et al. ............. | 362/96 |

FOREIGN PATENT DOCUMENTS

JP 7-105701 A 4/1995

* cited by examiner

Primary Examiner—Sandra O'Shea
Assistant Examiner—Ronald E. DelGizzi
(74) Attorney, Agent, or Firm—Birch, Stewart, Kolasch & Birch, LLP

(57) ABSTRACT

Vent holes are provided in a case for holding a bulb and a reflector for the bulb. The vent holes are covered with moisture permeation preventive watertight sheets, respectively. With this configuration, it is possible to prevent permeation of water from outside into a lamp, and ensures ventilation of the inside of the lamp.

19 Claims, 9 Drawing Sheets

WATER IMPERMEABLE LIGHTING DEVICE FOR A VEHICLE

BACKGROUND OF THE INVENTION

1. Field of the Invention

The present invention relates to a lighting device for a vehicle, having a non-cut clear lens and a reflector for determining a light distribution characteristic of the lighting device, and more particularly, to a lighting device for a vehicle, which is suitable for preventing occurrence of condensation on the inner surface of a clear lens.

2. Background Art

In some conventional lighting devices, the light distribution characteristic is determined by a multi-surface reflector having reflection surfaces capable of selectively reflecting light emitted from a bulb, at multiple angles. According to such a lighting device, since the light distribution can be determined by the multi-surface reflector, a non-cut clear lens can be used as the front side lens of the lighting device. This is advantageous in that it can exhibit a desirable appearance different from that of a lighting device using a cut lens; however, such a lighting device is disadvantageous in that since the inside of the lighting device is visible as it is seen from the outside through the clear lens, condensation, water droplets, damp haze, and the like due to moisture in the lighting device become conspicuous.

A lighting device for preventing occurrence of condensation and damp haze due to moisture in the lighting device has been purposed, for example, in Japanese Patent Laid-open No. Hei 7-105701, in which a vent hole for ventilating the inside of the lighting device and a vent pipe mounted in the vent hole are provided in a housing for housing a bulb and a reflector.

For a vehicle used for running only on a paved roadway or regular roadway, the inside of a lighting device can be ventilated by using the above-described vent hole and vent pipe. However, for an ATV (All Terrain vehicle), or other vehicles, used for running not only on regular roadways, but also "off-road," the inside of a lighting device does not receive sufficient ventilation, using the device and method of the above laid-open Japanese Patent.

Namely, since such a vehicle sometimes runs on rugged unpaved roadways, the lighting device may be immersed in water for a short time. If this occurs, the device and method of the Laid-open Japanese patent are insufficient to prevent permeation of water into the lighting device. As a result, When the lighting device is immersed in water, condensation forms on the lens, which cannot be removed for a long period of time.

SUMMARY OF THE INVENTION

An object of the present invention is to solve the above-described problem and to provide a lighting device for a vehicle, which is capable of preventing water from permeating a lighting device, thereby efficiently preventing occurrence of water droplets and condensation caused by moisture build-up in the lighting device.

To achieve the above object and additional objects, according to embodiments of the present invention, there is provided a lighting device for a vehicle which includes a casing having a lens member attached thereto, a luminance means operatively disposed within said casing, at least one vent hole bored through said casing, and a sheet member for covering said vent hole, said sheet member being water impermeable, thereby substantially preventing water from entering said casing.

In addition, there is provided a vehicle lighting device including a vehicle body frame having a plurality of wheels attached thereto, a handlebar attached to said vehicle body frame, said handlebar operative to steer at least one of said plurality of wheels, and means attached to said vehicle body frame for mounting at least one casing for housing a luminance means, wherein said at least one casing includes at least one vent hole bored therethrough, and a sheet member for covering said vent hole, said sheet member being water impermeable, thereby substantially preventing water from entering said casing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 11:
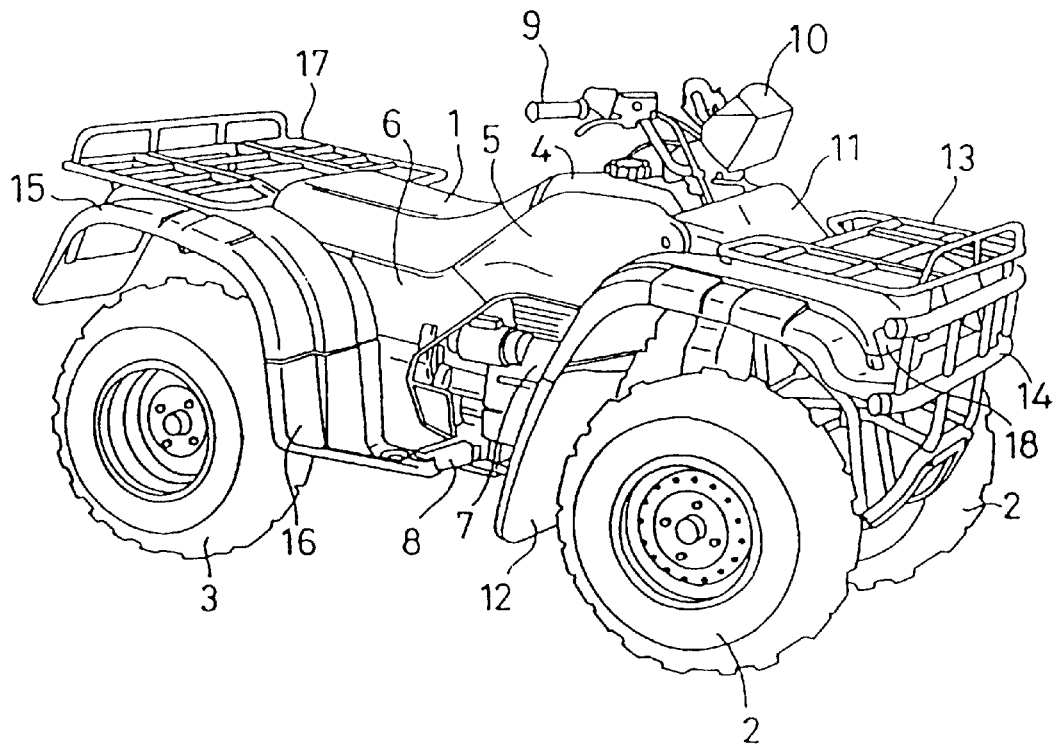
FIG. 11 is a perspective view of a working vehicle to which the present invention is applied.

Hereinafter, the present invention will be described with reference to the drawings. FIG. 11 is a perspective view showing an appearance of a working vehicle on which a lighting device according to one embodiment of the present invention is mounted. Referring to FIG. 11, the vehicle includes a driver's seat 1 provided between front wheels 2 and rear wheels 3, on each of which a balloon tire is mounted and a fuel tank 4 disposed in front of the seat 1. Both sides of the fuel tank 4 are covered with side covers 5, and lower side covers 6 extend downwardly from the side covers 5. A drive system including an engine 7 is housed in lower portions of these side covers 5 and 6. Step bars 8 are provided on which a driver sitting on the seat 1 rests his feet.

A handlebar 9 and an instrument box 10 adjacent thereto are provided in front of the fuel tank 4. A portion in front of the handlebar 9 is covered with a front fender 11. A front mud guard 12 for avoiding mud splash is provided behind the front wheels 2. A front carrier 13 on which baggage may be placed is provided on an upper portion of the front fender 11, and a carrying pipe 14 for protecting the front surface of the vehicle is mounted on the front side of the front carrier 13. A rear fender 15 and a rear mud guard 16 extending forwardly therefrom are provided on the rear wheel 3 side, and a rear carrier 17 is provided on an upper portion of the rear fender 15.

A pair of right and left headlamps 18 (one is hidden behind the carrying pipe 14) are mounted in front of the front fender 11, and are protected by the carrying pipe 14. The headlamp 18 has a multi-surface reflector for reflecting light, emitted from a bulb, at multiple angles and a non-cut clear lens. The headlamp 18 and the structure for mounting the headlamp 18 to the front fender 11 will be described in detail later. In addition, a tail-lamp (not shown) is provided on a rear portion of the working vehicle. The tail-lamp will also be described in detail later.

Figure 12:
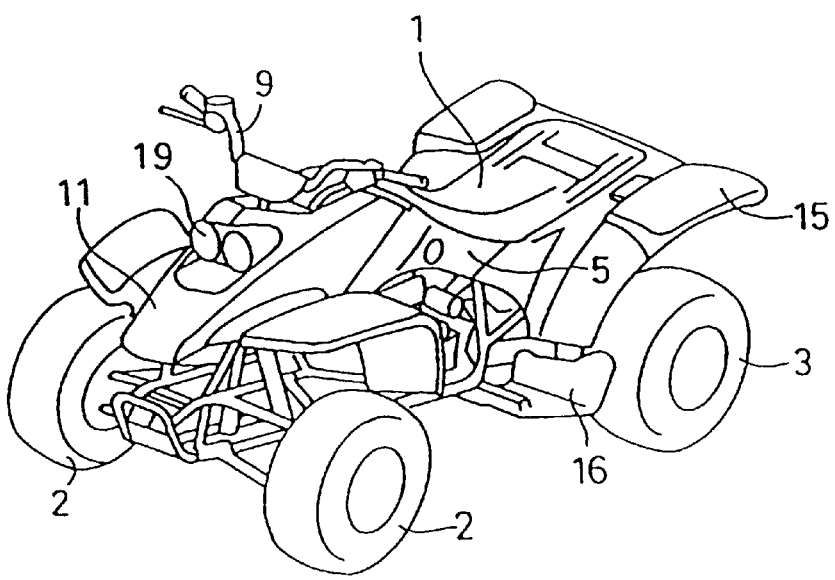
FIG. 12 is a perspective front view of a leisure vehicle to which the present invention is applied.
Figure 13:
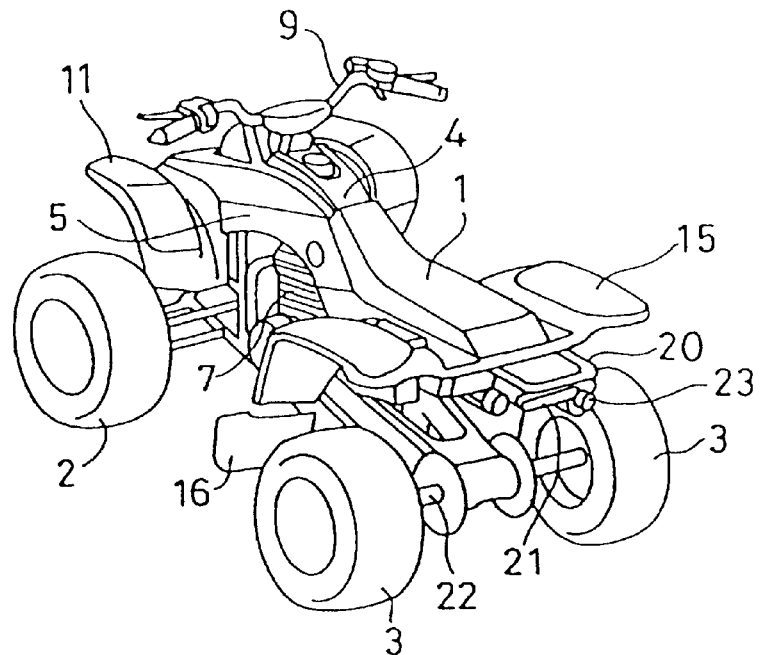
FIG. 13 is a perspective rear view of the leisure vehicle to which the present invention is applied.

FIG. 12 is a perspective front view showing an appearance of a leisure vehicle on which a lighting device of the present invention is mounted, and FIG. 13 is a perspective rear view of the leisure vehicle shown in FIG. 12. In these figures, parts being the same as or similar to those shown in FIG. 11 are designated by the same reference numerals, and the overlapped description thereof is omitted. The leisure vehicle includes a double-lamp type headlamp 19 having two lamps adjacent to each other in the horizontal direction. The two-lamp type headlamp 19 is housed in a front fender 11 at a position near a handlebar 9 (see FIG. 12). Like the headlamp 18 of the above-described working vehicle, each lamp of the two-lamp type headlamp 19 has a multi-surface reflector and a clear lens.

A horizontally elongated tail-lamp 21 is provided on a rear frame 20 of the vehicle. In addition, a rear axle 22 is provided on the rear portion of the vehicle, and power transmitted from an engine 7 by means of a drive chain is transmitted to rear wheels 3 via the rear axle 22. Reference numeral 23 designates a muffler.

Figure 14:
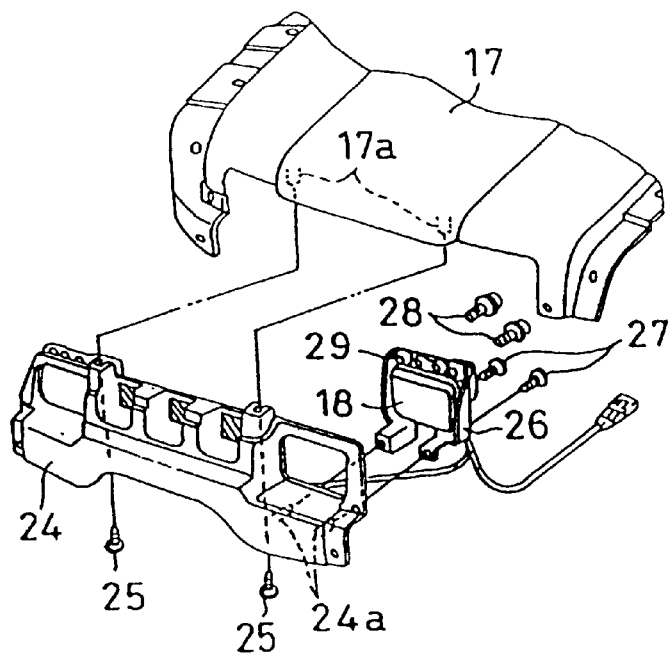
FIG. 14 is an exploded view of a front portion of the working vehicle.

The structures of mounting the above-described headlamp and tail-lamp will be described below. FIG. 14 is a detailed exploded view of a front portion of the working vehicle, and FIG. 15 is a detailed perspective view of a rear portion of the working vehicle. Referring to FIG. 14, a headlamp grill 24 is fixed on a boss 17a, provided on the back face of the front fender 17, with screws 25. The headlamp 18 (only the left side is shown) is supported by a rear cover 26 (the detailed supporting structure will be described in detail later), and a lower portion of the rear cover 26 is fixed on a boss 24a of the headlamp grill 24 with screws 27. A rib (not shown) is formed on the back face of the front fender 17 in such a manner as to project therefrom, and an upper portion of the rear cover 26 is fixed on the front fender 17 by screwing a tip of a bolt 28 passing through the rib in a nut 29 provided on the rear cover 26.

Figure 15A:
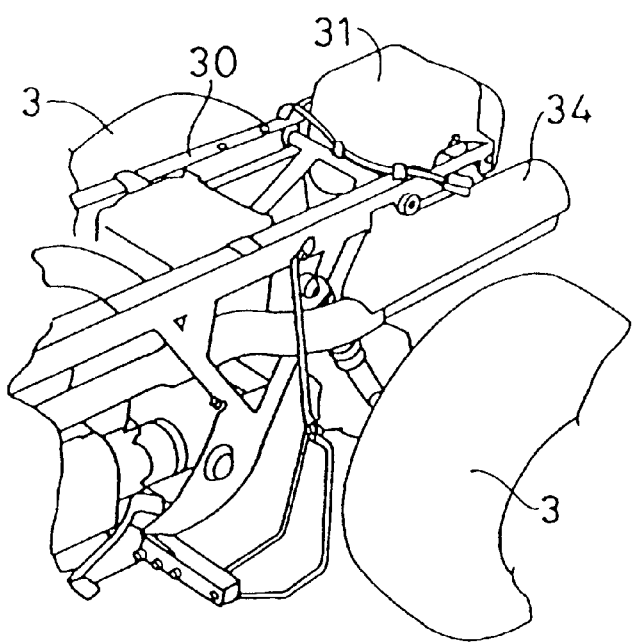
FIGS. 15(a) and 15(b) are exploded views of a rear portion of the working vehicle.
Figure 15B:
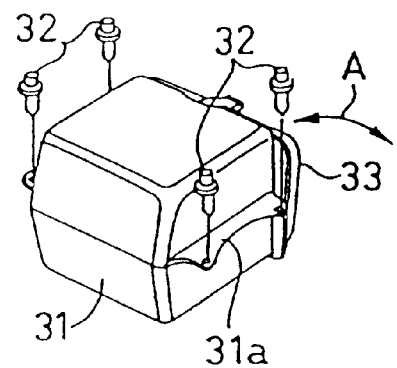

Referring to FIGS. 15(a) and 15(b), a tool box 31 is disposed at the rear end of a body frame 30 of the working vehicle. As shown in FIG. 15(b), the tool box 31 has right and left ribs 31a projecting in the horizontal direction and are held by the body frame 30 with holding clips 32. The tool box 31 has a lid 33 which has at its lower portion a hinge shaft openable/closable in the direction shown by an arrow A. The lid 33 has not only a functions as a lid for the tool box 31 but, also as a tail-lamp holding portion to be described later and as a cover for the tail-lamp. In addition, a muffler 34 provided on an exhaust pipe extending from the engine 7 is disposed alongside of the body frame 30.

Figure 1:
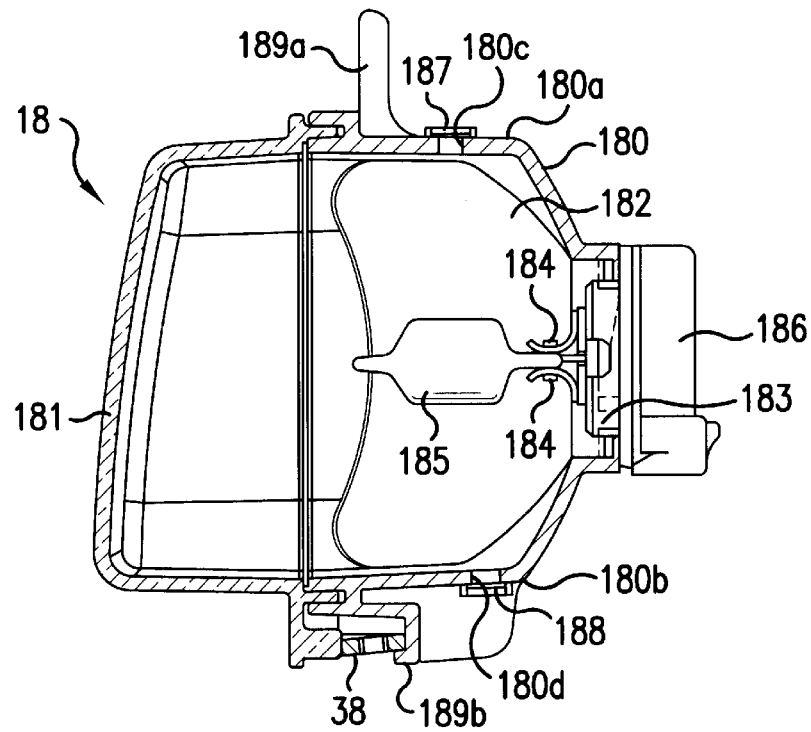
FIG. 1 is a sectional view taken on line I—I of FIG. 2, showing a headlamp according to a first embodiment of the present invention.
Figure 2:
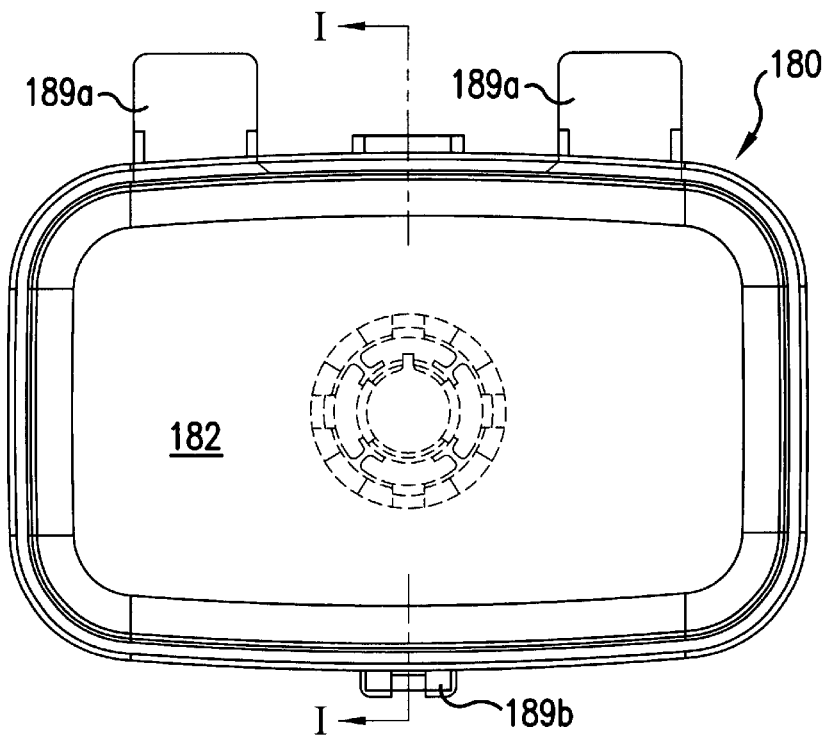
FIG. 2 is a front view of the headlamp according to the first embodiment.

The headlamp 18 will be more fully described below. FIG. 2 is a front view of the headlamp 18, and FIG. 1 is a sectional view taken on line A—A of FIG. 2. Referring to these figures, the headlamp 18 has a case 180, and a lens 181 held by the case 180 in a state being fitted in a groove provided at the front edge of the case 180. The lens 181 is non-cut clear lens. A multi-surface reflector 182 is provided on the inner surface side of the case 180. An insulator 183 is fitted in a center portion, that is, a bottom portion of the case 180, and a contact member 184 is molded in the insulator 183. A bulb 185 is clamped by one end of the contact member 184. The other end of the contact member 184 extends from the insulator 183 in such a manner as to project rearwardly from the headlamp 18, and, forms a connector with a power supply cable (not shown). The connector is covered with an insulating rubber cover 186.

Vent holes 180c and 180d for ventilating the inside of the lamp are formed in a top surface 180a and a bottom surface 180b of the case 180, respectively. The vent holes 180c and 180d are covered with moisture permeation preventive watertight sheets 187 and 188 which are formed of moisture permeation preventive watertight fiber films allowing permeation of air but disallowing permeation of water, respectively. With the provision of the moisture permeation preventive watertight sheets 187 and 188, if the headlamp 18 is temporarily immersed in water, the water less permeates in the lamp through the vent holes 180c and 180d, and even if the water permeates in the lamp, wet air in the lamp is replaced with outside air through the moisture permeation preventive watertight sheets 187 and 188. As a result, moisture in the lamp is eliminated, to thereby prevent occurrence of condensation on the lens 181.

Two brackets 189a projecting upright from the upper surface 180a are formed on the upper surface 180a of the case 180. A box-shaped holding portion 189b, which is opened rearwardly of the lamp and which has a nut 38 on its lower wall surface, is formed on the lower surface 180b. These brackets 189a and the projecting portion 189b are used for supporting the headlamp 18 on the rear cover 26. The supporting structure using the brackets 189a and the projecting portion 189b will be described below.

Figure 3:
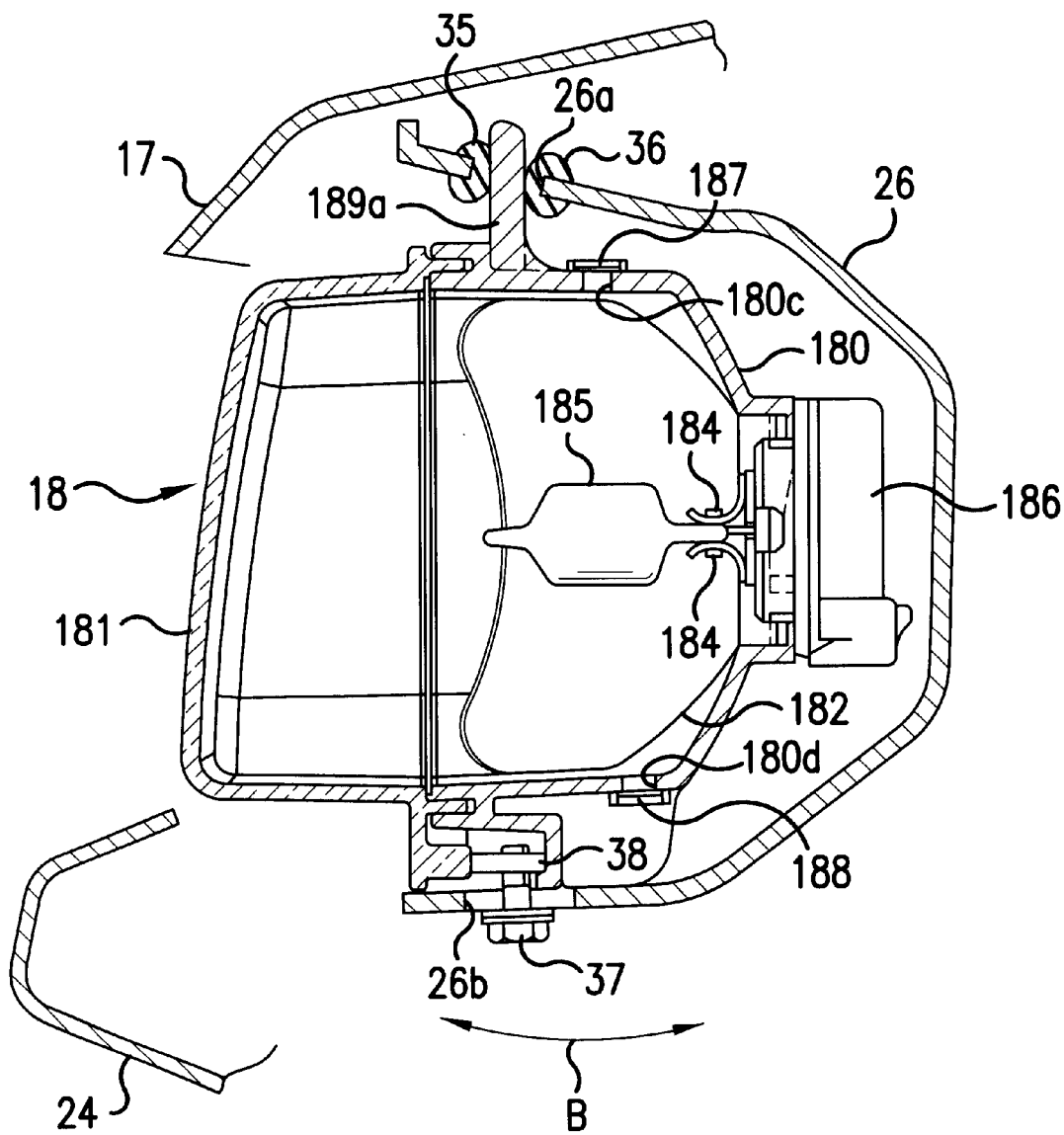
FIG. 3 is a sectional view showing a structure for supporting the headlamp according to the first embodiment.

FIG. 3 is a sectional view showing the structure for supporting the headlamp 18. In this figure, parts being the same as or similar to those shown in FIGS. 1 and 2 are designated by the same reference numerals. The rear cover 26 are, as described above, fixed to the front fender 17 and the headlamp grill 24 with bolts or the like. An upper portion of the rear cover 26 has slots 26a, each of which has a shape corresponding to that of the brackets 189a, for allowing each of the brackets 189a to pass therethrough, respectively. A suitable space is formed between the slots 26a and the brackets 189*a*, and rubber cushioning members 35 and 36 are fitted in the space in such a manner as to be in contact with both surfaces of the brackets 189*a*, respectively.

The lower portion of the rear cover 26 has a slot 26*b*. A bolt 37 is inserted in the slot 26*b* from below upward, passing through the slot 26*b*, and is screwed in the nut 38. In addition, the nut 38 is desirable to be previously fixed to the holding portion 189*b* or at least held by the holding portion 189*b* in such a manner as not to be rotated. The length of the slot 26*b* is set such that the headlamp 18 supported by the cushioning members 35 and 36 can be swingable at a desirable angle in the direction shown by an arrow B. Here, the desirable angle means an angle sufficient for adjustment of the optical axis (aiming) of the headlamp 18. For aiming of the headlamp 18, the bolt 37 is loosened to swing the headlamp 18 for adjustment, and after the adjustment is completed, the bolt 37 is fastened to fix the adjusted angle of the headlamp 18.

Figure 4:
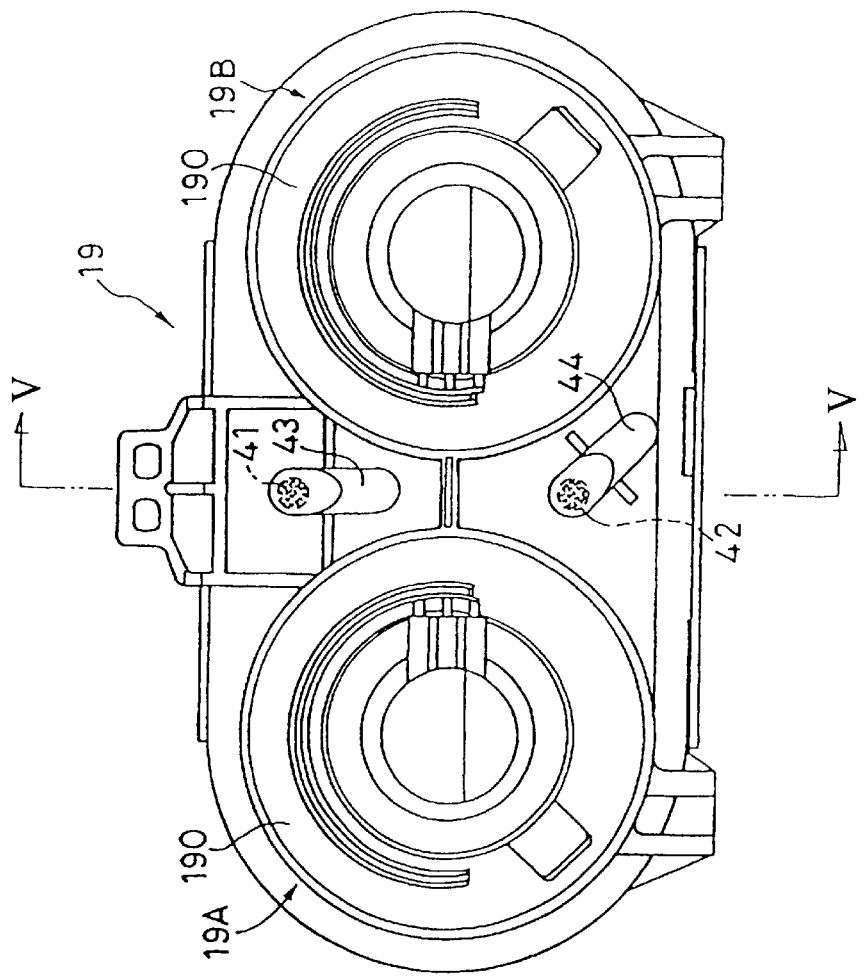
FIG. 4 is a rear view of a two-lamp type headlamp according to a second embodiment of the present invention.
Figure 5:
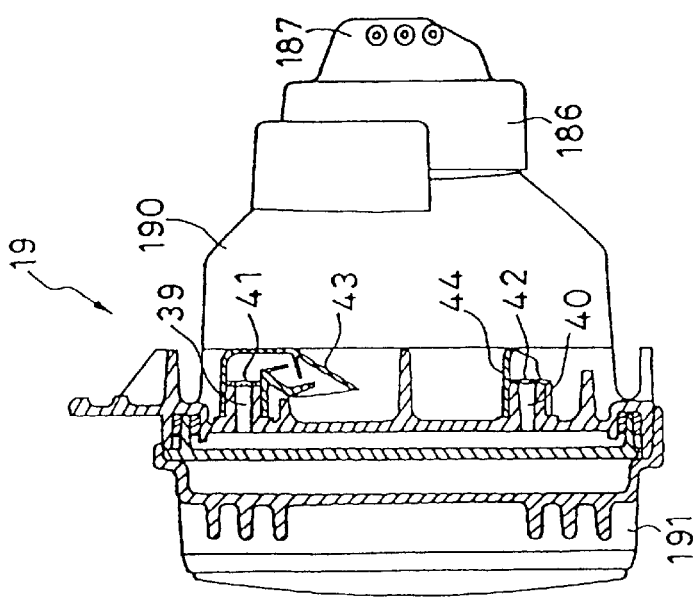
FIG. 5 is a sectional view taken on line V—V of FIG. 4, showing the two-lamp type headlamp according to the second embodiment.

The structure of the two-lamp type headlamp 19 for the leisure vehicle (see FIG. 12) will be described below. FIG. 4 is a rear view showing an essential structure of 1 the headlamp 19, and FIG. 5 is a sectional view taken on line B—B of FIG. 4. The headlamp 19 is composed of a pair of right and left lamps 19A and 19B, each of which has a case 190 and a lens 191. A rear portion of the case 190 is covered with an insulating rubber cover 186, and a current feeding terminal 187 projects from a side of the rear end of the rubber cover 186.

The cases 190 for the right and left lamps 19A and 19B are not separately but integrally formed, and the lenses 191 for the right and left lamps 19A and 19B are also integrally formed. In other words, the inner spaces of the lamps 19A and 19B are by communicated to each, other. The space of the communication portion, that is, the intermediate portion between the lamps 19A and 19B has vent holes 39 and 40 for communicating the space of the communication portion to the outside. The vent holes 39 and 40 are formed in the back face of the headlamp 19, that is, on the case 190 side of the headlamp 19. The vent holes 39 and 40 are covered with moisture permeation preventive watertight sheets 41 and 42, respectively. Bosses in which the vent holes 39 and 40 are formed are covered with vent pipes 43 and 44, respectively. Each of the vent pipes 43 and 44 has a labyrinth seal structure exhibiting a large resistance against water entered from the outside.

Since the bosses, in which the vent holes 39 and 40 are formed, are covered with the vent pipes 43 and 44 each having the labyrinth seal structure, water does not easily reach the vent holes 39 and 40, and since the vent holes 39 and 40 are covered with the moisture permeation preventive watertight sheets 41 and 42, water is essentially unable to permeate the headlamp 19. Further, even if water permeates the headlamp 19, since air in the headlamp 19 can flow to the outside, sufficient ventilation for the inside of the headlamp 19 can be ensured. In the example of this two-lamp type headlamp 19, the vent holes are formed in the communication portion between the lamps 19A and 19B; however, the vent holes are not necessarily formed in the communication portion but may be independently formed for each of the lamps 19A and 19B, just as in the example of the headlamp 18. the labyrinth seal structure, water does not easily reach the vent holes 39 and 40, and since the vent holes 39 and 40 are covered with the moisture permeation preventive watertight sheets 41 and 42, water is essentially unable to permeate the headlamp 19. Further, even if water permeates the headlamp 19, since air in the headlamp 19 can flow to the-outside, sufficient ventilation for the inside of the headlamp 19 can be ensured. In the example of this two-lamp type headlamp 19, the vent holes are formed in the communication portion between the lamps 19A and 19B; however, the vent holes are not necessarily formed in the communication portion but may be independently formed for each of the lamps 19A and 19B, just as in the example of the headlamp 18.

Figure 6:
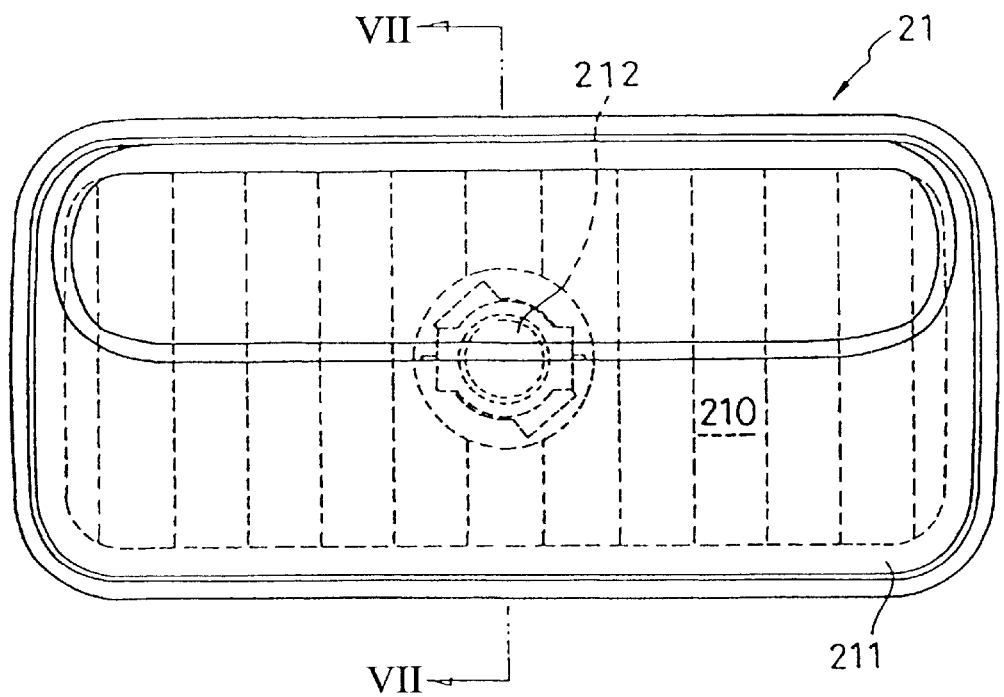
FIG. 6 is a front view of a tail-lamp according to a third embodiment.
Figure 7:
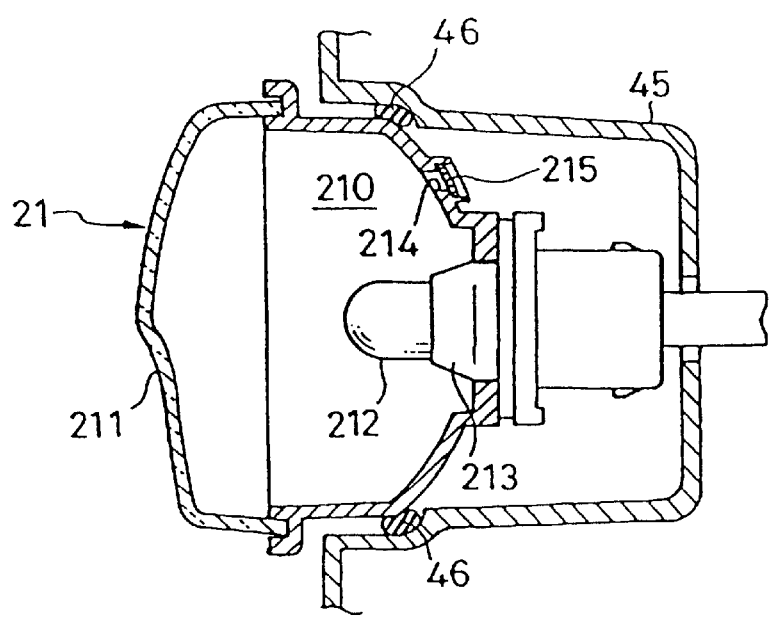
FIG. 7 is a sectional view taken on line VII—VII of FIG. 6, showing the tail-lamp according to the third embodiment.

The structure of the tail-lamp 21 will be described below. FIG. 6 is a front view of the tail-lamp 21 of the leisure vehicle shown in FIG. 13, and FIG. 7 is a sectional view taken on line C—C of FIG. 6. Referring to FIGS. 6 and 7, the tail-lamp is composed of a reflector 210 So and a lens 211. The reflector 210 is a multi-surface reflector, and the lens 211 is a non-cut clear lens. A bulb 212 held by a socket 213 is disposed at the center of the reflector 210. A reflector plane of the reflector 210 has a vent hole 214 for ventilating the inside of the tail-lamp 21, and the vent hole 214 is covered with a moisture permeation preventive watertight sheet 215, like the above-described headlamps 18 and 19.

A cover 45 is provided on the outer peripheral surface of the reflector 210. The cover 45 functions not only to support the tail-lamp 21 but also to form a buffer space (breathing space) for preventing outside air having a large temperature gradient between an inner atmosphere and the same from directly entering in the tail-lamp 21. Seal rings 46 for preventing permeation of water from the front surface side, that is, the lens 211 side of the tail-lamp 21 and for serving as a cushioning member is disposed between the cover 45 and the reflector 210. The seal rings 46 can be made from rubber or sponge. In addition, the cover 45 is fixed on the tail-lamp 21 with locking screws (not shown).

Figure 8:
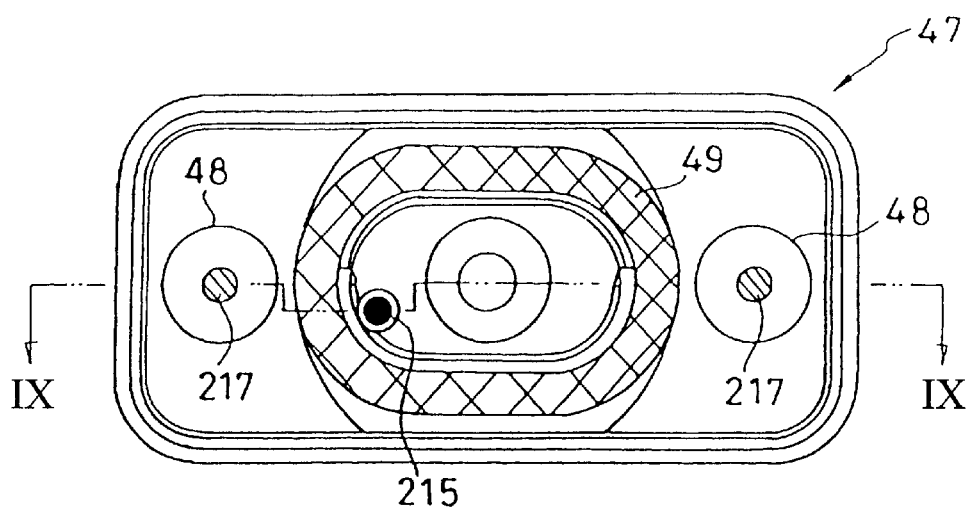
FIG. 8 is a rear view of a tail-lamp according to a fourth embodiment.
Figure 9:
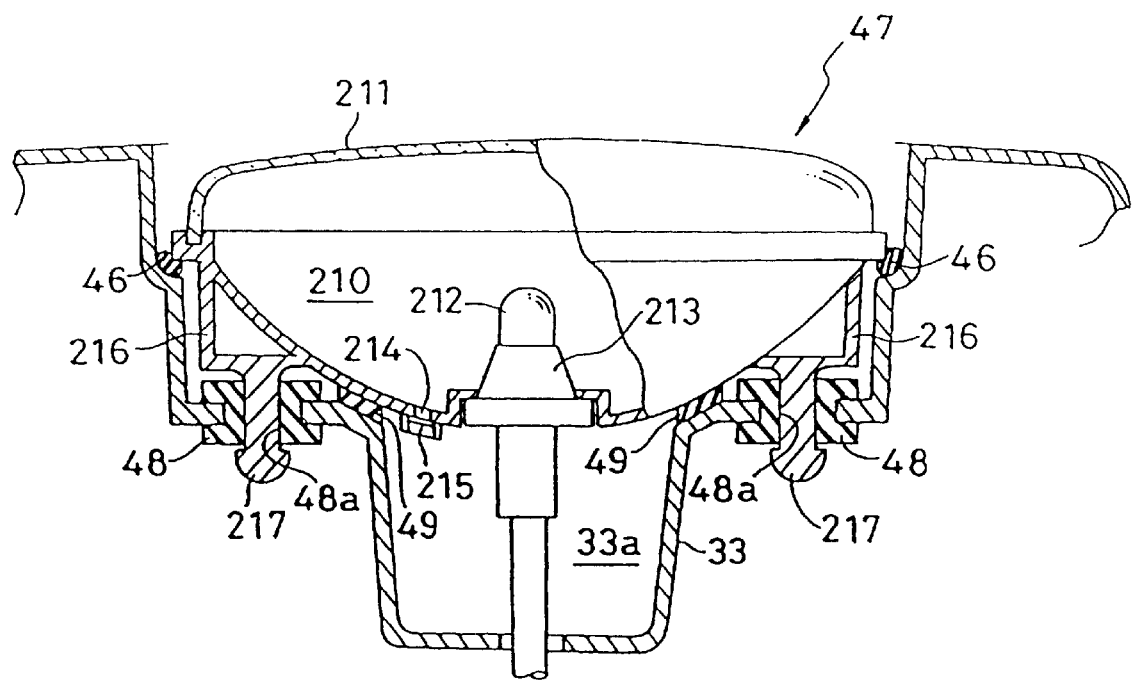
FIG. 9 is a sectional view taken on line IX—IX of FIG. 8, showing the tail-lamp according to the fourth embodiment.

The tail-lamp of the above-described working vehicle will be described below. FIG. 8 is a rear view of the tail-lamp of the working vehicle, and FIG. 9 is a sectional view taken on line D—D of FIG. 8. In these figures, parts being the same as or similar to those shown in FIG. 7 are designated by the same reference numerals. Referring to FIGS. 8 and 9, the lamp (reflector 210, lens 211, bulb 212 and the like) of the tail-lamp 47 is contained in a recess formed in a lid 33 of the tool box 31 provided on the rear portion of the working vehicle. A region surrounded by the outer surface of a top portion of the reflector 210 and the outer surface of the lid 33 forms a breathing-space 33*a*.

A mounting base 216 is provided on the outer surface of the reflector 210, and pins 217 are formed on the mounting base 216. Grommets 48 are fitted in the lid 33, and the lamp of the tail-lamp 47 is fixed on the lid 33 by inserting the pins 217 in central holes of the grommets 48. A seal ring 46 is provided between the reflector 210 and the lid 33, and a seal ring 49 is provided between a portion near the top portion of the reflector 210 and the lid 33.

A plane of the reflector 210, which forms the breathing space 33*a*, has a vent hole 214 covered with a moisture permeation preventive watertight sheet 215. With the provision of the vent hole 214 and the moisture permeation preventive watertight sheet 215, it is possible to prevent permeation of water in the lamp of the tail-lamp 47 and to ventilate the inside of the lamp through the breathing space 33*a*.

Figure 10:
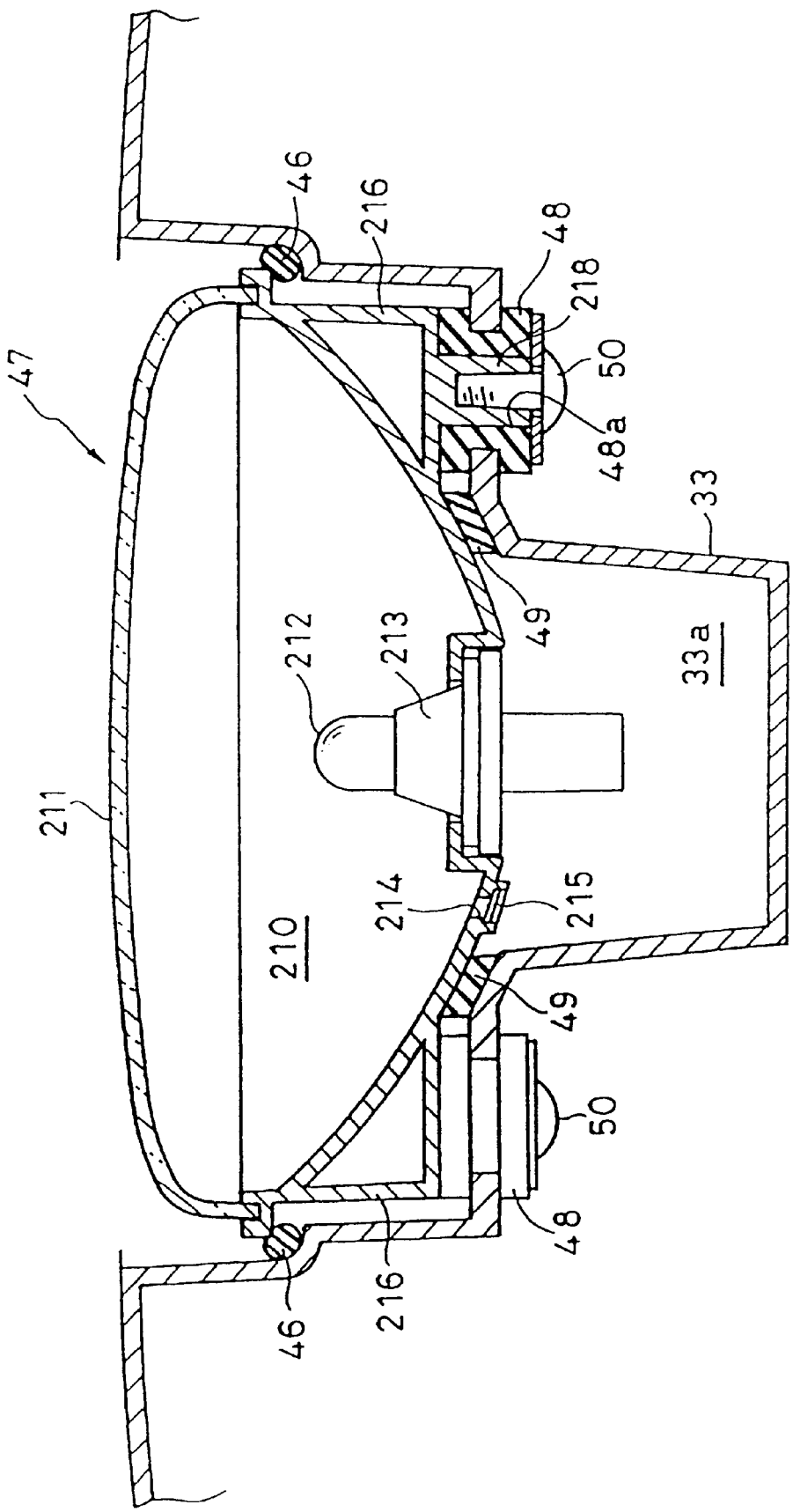
FIG. 10 is a sectional view of a tail-lamp according to a fifth embodiment.

Next, a variation of the tail-lamp 47 will be described. FIG. 10 is a sectional view showing the variation of the tail-lamp 47 of the working vehicle. In this figure, parts being the same as or similar to those shown in FIG. 9 are designated by the same reference numerals. This variation is different from the embodiment shown in FIGS. 8 and 9 in terms of the structure for fixing the lamp of the tail-lamp 47 to the lid 33. Referring to FIG. 10, a boss 218 is formed on a mounting base 216 of the reflector 210. The boss 218 is inserted in a hole 48a of the lid 33 via a grommet 48. The tail-lamp 47 is fixed on the lid 33 by means of a locking screw 50 screwed in the boss 218 from the back side of the lid 33.

According to the above-described embodiments of the present invention, since the vent hole formed in the case of the headlamp or in the reflector of the tail-lamp is covered with the moisture permeation preventive watertight sheet, it is possible to replace air in the lamp with outside air, and even if the lamp is immersed in water, it is possible to prevent permeation of water into the lamp for a short time. In addition, if the cover is provided in such a manner as to cover the vent hole formed in the reflector of the tail-lamp, the moisture permeation preventive watertight sheet may be omitted as needed. In this case, even if the lamp is immersed in water, it is possible to prevent permeation of water in the lamp for a short time by the covering function of the cover.

As is apparent from the above description, it is possible to prevent permeation of water in a lamp of the lighting device, and to ventilate the inside of the lamp. Accordingly, even in running of the vehicle in a state in which the lighting device is splashed with water or immersed in water, it is possible to prevent occurrence of condensation on the lens of the lighting device. In particular, the lighting device of the present invention is suitably used for an off-road working vehicle or leisure vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lighting device for a vehicle, comprising:
   a casing having a lens member attached thereto;
   a light source disposed within said casing;
   at least one vent hole bored through said casing;
   a sheet member for covering said vent hole, said sheet member being substantially water impermeable, thereby substantially preventing water from entering said casing; and
   a cover substantially encircling a rear of said casing and forming a breathing space between said rear of said casing and said cover, wherein said at least one vent hole communicates with said breathing space.

2. The lighting device for a vehicle as set forth in claim 1, wherein said casing includes a plurality of vent holes bored therethrough, one of said plurality of vent holes is disposed on a top surface of said casing and another of said plurality of vent holes is disposed on a bottom surface of said casing, each of said plurality of vent holes having a substantially water impermeable sheet member for covering an opening thereof.

3. The lighting device for a vehicle as set forth in claim 1, wherein said casing includes at least one bracket for securably attaching said casing to said cover.

4. The lighting device for a vehicle as set forth in claim 1, wherein said casing has top, bottom and rear surfaces and includes a plurality of vent holes bored through said rear surface, each of said plurality of vent holes having a substantially water impermeable sheet member for covering an opening thereof.

5. The lighting device for a vehicle as set forth in claim 4, wherein a first of said plurality of vent holes is positioned along a top edge and essentially halfway between lateral edges of said casing, and a second of said plurality of vent holes is positioned along a bottom edge of said casing and inline with said first vent hole.

6. The lighting device for a vehicle as set forth in claim 4, wherein each of said plurality of vent holes includes a vent pipe extending therefrom, and each of said vent pipes is bent.

7. The lighting device for a vehicle as set forth in claim 1, wherein said casing has an inner surface portion being reflective in nature.

8. The lighting device for a vehicle as set forth in claim 1, further comprising at least one seal ring member disposed between a surface of said casing and a surface of said cover member, wherein said at least one seal ring is operatively disposed to substantially prevent water from permeating into said breathing space.

9. A vehicle lighting device, comprising:
   a vehicle body frame having, a plurality of wheels attached thereto;
   a handlebar attached to said vehicle body frame, said handlebar operative to steer at least one of said plurality of wheels; and
   a casing attached to said vehicle body;
   a light source disposed within said casing;
   at least one vent hole bored through said casing;
   a cover substantially encircling a rear of said casing and forming a breathing space between said rear of said casing and said cover, wherein said at least one vent hole communicates with said breathing space; and
   a sheet member covering said at least one vent hole, said sheet member being substantially water impermeable, thereby substantially preventing water from entering said casing.

10. The vehicle lighting device as set forth in claim 9, wherein said casing is connected to a tool box disposed down stream of said handlebar and attached to a portion of said vehicle body frame.

11. The vehicle lighting device as set forth in claim 10, wherein said tool box includes a receiving part for receiving and holding said at least one casing, said receiving part acting to form said cover and forming said breathing space between an exterior surface of said casing and a surface of said receiving part, and further comprising:
   a sealing ring provided between said receiving part and said casing for substantially preventing water from permeating into said breathing space.

12. The vehicle lighting device as set forth in claim 11, wherein said receiving part is a lid for said tool box.

13. The vehicle lighting device as set forth in claim 9, wherein said casing includes a plurality of vent holes bored therethrough, one of said plurality of vent holes is disposed on a top surface of said casing and another of said plurality of vent holes is disposed on a bottom surface of said casing, each of said plurality of vent holes having said sheet member for covering an opening thereof.

14. The vehicle lighting device as set forth in claim 9, wherein said casing includes at least one bracket member for securably attaching said casing to said cover.

15. A vehicle lighting device, comprising:
   a vehicle body frame having a plurality of wheels attached thereto;

a handlebar attached to said vehicle body frame, said handlebar operative to steer at least one of said plurality of wheels; and
  a tool box disposed down stream of said handlebar and attached to a portion of said vehicle body frame;
  a casing mounted to said tool box;
  a light source provided in said casing;
  at least one vent hole bored through said casing;
  a cover substantially encircling a rear of said casing and forming a breathing space between said rear of said casing and said cover, wherein said at least one vent hole communicates with said breathing space; and
  a sheet member covering said at least one vent hole, said sheet member being substantially water impermeable, thereby substantially preventing water from entering said casing.

16. The vehicle lighting device as set forth in claim 15, wherein said tool box includes a receiving part for receiving and holding said at least one casing, said receiving part acting to form said cover and forming said breathing space between an exterior surface of said casing and a surface of said receiving part, and further comprising:
  a sealing ring provided between said receiving part and said casing for substantially preventing water from permeating into said breathing space.

17. The vehicle lighting device as set forth in claim 16, wherein said receiving part is a lid for said tool box.

18. The vehicle lighting device as set forth in claim 15, wherein said casing includes a plurality of vent holes bored therethrough, one of said plurality of vent holes is disposed on a top surface of said casing and another of said plurality of vent holes is disposed on a bottom surface of said casing, each of said plurality of vent holes having said sheet member for covering an opening thereof.

19. The vehicle lighting device as set forth in claim 15, wherein said casing includes at least one bracket member for securably attaching said casing to said cover.

* * * * *